US011477171B2

(12) United States Patent
Rodriguez Bravo et al.

(10) Patent No.: US 11,477,171 B2
(45) Date of Patent: Oct. 18, 2022

(54) CLIENT AUTHENTICATION MANAGEMENT BASED UPON MODELING

(71) Applicant: Kyndryl, Inc., New York, NY (US)

(72) Inventors: Cesar Augusto Rodriguez Bravo, San Rafael de Alajuela (CR); John R. Feezell, Pikeville, TN (US); Edgar A. Zamora Duran, Heredia (CR); Craig M. Trim, Ventura, CA (US)

(73) Assignee: Kyndryl, Inc., New York, NY (US)

( * ) Notice: Subject to any disclaimer, the term of this patent is extended or adjusted under 35 U.S.C. 154(b) by 426 days.

(21) Appl. No.: 16/699,112

(22) Filed: Nov. 29, 2019

(65) Prior Publication Data
US 2021/0168123 A1    Jun. 3, 2021

(51) Int. Cl.
*H04L 9/40* (2022.01)
*G06N 20/00* (2019.01)

(52) U.S. Cl.
CPC ......... *H04L 63/0428* (2013.01); *G06N 20/00* (2019.01); *H04L 63/08* (2013.01)

(58) Field of Classification Search
CPC ..... G06F 21/31; G06F 21/46; G06K 9/00067; H04L 63/08
See application file for complete search history.

(56) References Cited

U.S. PATENT DOCUMENTS

| 8,272,033 B2 | 9/2012 | Wasmund |
| 9,280,657 B2 | 3/2016 | Eluard et al. |

(Continued)

FOREIGN PATENT DOCUMENTS

| EP | 2955657 A1 * | 12/2015 | ............. G06F 21/31 |
| JP | 2005149388 A | 6/2005 | |

(Continued)

OTHER PUBLICATIONS

Chatterjee, Rahul et al. The TypTop System: Personalized Typo-Tolerant Password Checking. CCS '17, Proceedings of the 2017 ACM SIGSAC Conference on Computer and Communications Security, Oct. 30-Nov. 3, 2017, Dallas, TX. ACM: New York. [20 pages].

(Continued)

*Primary Examiner* — Matthew Smithers
*Assistant Examiner* — Shu Chun Gao
(74) *Attorney, Agent, or Firm* — The Steadman Law Firm PLLC

(57) ABSTRACT

Techniques are described with regard to client authentication management. An associated method includes constructing an authentication resolution model specific to a client based upon error patterns respectively included in a plurality of erroneous authentication submissions inconsistent with a proper authentication submission. The method further includes receiving, via an authentication interface, a new erroneous authentication submission inconsistent with the proper authentication submission. Responsive to determining that the new erroneous authentication submission corresponds to an authentication exception defined in the authentication resolution model, the method further includes completing authentication. Responsive to determining that the new erroneous authentication submission corresponds to an authentication warning defined in the authentication resolution model, the method further includes performing at least one client account warning protection activity. Responsive to determining that the new erroneous authentication submission corresponds to an authentication attack defined in the authentication resolution model, performing at least one client account attack protection activity.

20 Claims, 5 Drawing Sheets

(56) References Cited

U.S. PATENT DOCUMENTS

| | | | |
|---|---|---|---|
| 9,722,996 | B1 | 8/2017 | Kolman et al. |
| 9,881,147 | B1 | 1/2018 | Windell et al. |
| 2011/0185401 | A1* | 7/2011 | Bak ..................... G06F 16/9024 726/5 |
| 2015/0363593 | A1 | 12/2015 | Joye |
| 2017/0214712 | A1 | 7/2017 | Maxwell et al. |

FOREIGN PATENT DOCUMENTS

| | | | |
|---|---|---|---|
| JP | 2010086383 | A | 4/2010 |
| JP | 5365120 | B2 | 12/2013 |
| JP | 2014212521 | A | 11/2014 |

OTHER PUBLICATIONS

Naqvi, M. Faisal. Reinspecting Password, Account Lockout and Audit Policies. ISACA Journal vol. 2, 2014, Accessed on May 28, 2019 [6 printed pages] <https://www.isaca.org/Journal/archives/2014/Volume-2/Pages/JOnline-Reinspecting-Password-Account-Lockout-and-Audit-Policies.aspx>.

Autocomplete Enabled (Password Field). Netsparker, Accessed on May 28, 2019 [4 printed pages] <https://www.netsparker.com/web-vulnerability-scanner/vulnerabilities/autocomplete-enabled-password-field/>.

How to turn off form autocompletion. MDN Web Docs, Accessed on May 28, 2019. [4 printed pages] <https://developer.mozilla.org/en-US/docs/Web/Security/Securing_your_site/Turning_off_form_autocompletion>.

Autocomplete ='off' is not working when the inputtype is password and make the input field above it to enable autocomplete. Stack Overflow, Accessed on May 28, 2019. [13 printed pages] <https://stackoverflow.com/questions/17719174/autocomplete-off-is-not-working-when-the-input-type-is-password-and-make-the>.

Password Variator. Last Bit Software, Accessed on May 28, 2019. [2 printed pages] <http://lastbit.com/PasswordVariator/default.asp>.

Abizer. How an incorrectly configured account lockout policy can give more pain than security. Microsoft TechNet, Apr. 21, 2013. [5 printed pages] <https://blogs.technet.microsoft.com/abizerh/2013/04/21/how-an-incorrectly-configured-account-lockout-policy-can-give-more-pain-than-security/>.

Rumburg, Jeffrey. Metric of the Month: Service Desk Cost per Ticket. HDI, May 2, 2017. [8 printed pages] <https://www.thinkhdi.com/library/supportworld/2017/metric-of-month-service-desk-cost-per-ticket.aspx>.

How to turn off password and email/username autocomplete. GitHub Gist, Accessed on Sep. 17, 2019 [9 printed pages] <https://gist.github.com/runspired/b9fdf1fa74fc9fb4554418dea35718fe>.

Password field with autocomplete enabled. Portswigger, Accessed on Sep. 17, 2019. [1 printed page] <https://portswigger.net/kb/issues/00500800_password-field-with-autocomplete-enabled>.

Ashesh. Password type input with auto-complete enabled. HackerOne, Apr. 19, 2014. [2 printed pages] <https://hackerone.com/reports/7954>.

Finding and Fixing Vulnerabilities in AutoComplete Not Disabled, a Medium Risk Vulnerability. Beyond Security, Accessed on Sep. 17, 2019. [5 printed pages] <https://www.beyondsecurity.com/scan_pentest_network_vulnerabilities_autocomplete_not_disabled>.

Testing for Vulnerable Remember Password. OWASP Testing Guide v4, Accessed on Sep. 17, 2019. [2 printed pages] <https://www.owasp.org/index.php/Testing_for_Vulnerable_Remember_Password_(OTG-AUTHN-005)>.

TwistPass: The password variator. TwistPass, Accessed on Sep. 17, 2019. [3 printed pages] <https://twistpass.com/how-it-works/>.

JiJi Account Lockout Tool. Jiji Technologies, Accessed on Sep. 17, 2019 [2 printed pages] <https://www.jijitechnologies.com/jiji-account-lockout-reduce-heldeskcalls.aspx>.

* cited by examiner

CLIENT AUTHENTICATION MANAGEMENT BASED UPON MODELING

BACKGROUND

The various embodiments described herein generally relate to managing client authentication. More specifically, the various embodiments relate to managing authentication with respect to a client account based upon an authentication resolution model.

Conventional client account authentication and lockout policies may present undue burden with respect to client authentication, particularly in instances where a client inadvertently submits multiple erroneous authentication submissions. Specifically, when a client submits multiple erroneous authentication submissions, a conventional account lockout policy may require such client to consult a relevant help desk or to take other substantive action in order to restore account functionality, thus requiring time and/or expense on the part of both the client and the relevant organization(s) providing authentication services to the client.

SUMMARY

The various embodiments described herein provide techniques of managing client authentication based upon modeling. An associated computer-implemented method includes constructing an authentication resolution model specific to a client based upon error patterns respectively included in a plurality of erroneous authentication submissions inconsistent with a proper authentication submission required for an account associated with the client. The method further includes receiving, via an authentication interface, a new erroneous authentication submission inconsistent with the proper authentication submission. Responsive to determining that the new erroneous authentication submission corresponds to an authentication exception defined in the authentication resolution model, the method further includes completing authentication. In an embodiment, responsive to determining that the new erroneous authentication submission corresponds to an authentication warning defined in the authentication resolution model, the method further includes performing at least one client account warning protection activity. In another embodiment, responsive to determining that the new erroneous authentication submission corresponds to an authentication attack defined in the authentication resolution model, the method further includes performing at least one client account attack protection activity. In a further embodiment, the method includes updating the authentication resolution model based upon the new erroneous authentication submission.

In an embodiment, the step of constructing the authentication resolution model includes identifying correlations among the plurality of erroneous authentication submissions based upon application of at least one artificial intelligence algorithm and determining distinctions between the plurality of erroneous authentication submissions and the proper authentication submission based upon application of the at least one artificial intelligence algorithm. The step of constructing the authentication resolution model further includes defining at least one authentication exception, wherein each of the at least one authentication exception includes an error pattern that has a level of similarity to a pattern included in the proper authentication submission exceeding a predefined level of confidence threshold and that occurs a number of times exceeding a predefined error occurrence threshold over a duration of time exceeding a predefined learning threshold. In another embodiment, the step of constructing the authentication resolution model further includes defining at least one authentication warning, wherein each of the at least one authentication warning includes an error pattern that occurs a number of times exceeding the predefined error occurrence threshold over a duration of time less than or equal to the predefined learning threshold. In a further embodiment, the step of constructing the authentication resolution model also includes defining at least one authentication attack, wherein each of the at least one authentication attack includes a plurality of error patterns that occur an equal number of times and that collectively occur a number of times exceeding the predefined error occurrence threshold.

In an embodiment, each authentication exception defined in the authentication resolution model is encrypted to create a respective hashed exception by applying a hash function. According to such embodiment, identifying a correspondence between the new erroneous authentication submission and an authentication exception defined in the authentication resolution model includes applying the hash function to the new erroneous authentication submission to create a hashed result, comparing the hashed result to each respective hashed exception, and, responsive to identifying a match between the hashed result and a respective hashed exception, identifying the matching hashed exception as the corresponding authentication exception.

In an embodiment, the step of completing authentication includes confirming authentication of the client based upon the corresponding authentication exception defined in the authentication resolution model and facilitating access to the account associated with the client based upon a correlation identified between the corresponding authentication exception and the proper authentication submission. In another embodiment, the step of performing the at least one client account warning protection activity includes sending at least one notification to the client regarding the new erroneous authentication submission. In a further embodiment, the step of performing the at least one client account warning protection activity includes transmitting a secondary authentication request. In a further embodiment, the step of performing the at least one client account attack protection activity comprises facilitating client account lockout.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having a processor and a memory storing an application program, which, when executed on the processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not

DETAILED DESCRIPTION

Figure 1:
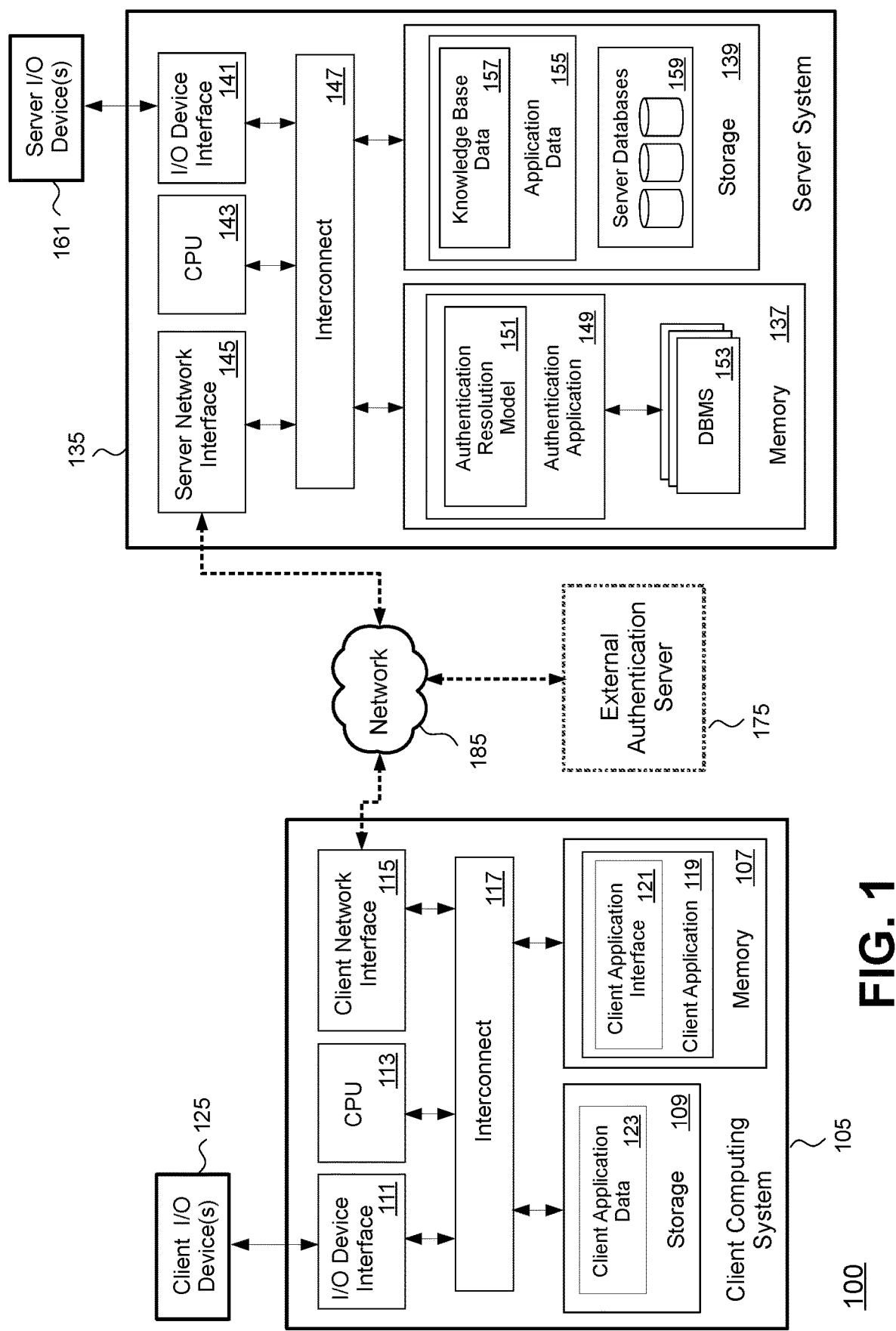
FIG. 1 illustrates a computing infrastructure, according to one or more embodiments.

The various embodiments described herein are directed to managing client authentication based upon modeling. An authentication application configured to implement techniques associated with the various embodiments constructs an authentication resolution model based upon error patterns in a plurality of erroneous authentication submissions. The authentication application may address a new erroneous submission based upon correspondence to any authentication exception, authentication warning, or authentication attack defined in the authentication resolution model.

The various embodiments described herein may have advantages over conventional techniques. Specifically, based upon an authentication resolution model specific to a relevant client, the various embodiments may improve computer technology by permitting recognition of an authentication exception such that it may be determined beyond a level of confidence that the certain erroneous authentication submission was made by the relevant client rather than by another entity. Accordingly, the relevant client may be granted account access based upon the authentication exception without an account lockout or any other account protection activity, thus minimizing client and/or organizational inefficiency. In certain cases, the relevant client optionally is granted account access based upon the authentication exception without requiring further authentication, thus minimizing risk of third party attacks from shouldering or direct exposure. Additionally, permitting recognition of an authentication exception may encourage more complex authentication schemes, e.g., more complex passwords. Moreover, based upon the authentication resolution model, the various embodiments may improve computer technology by permitting recognition of an authentication warning in response to a certain erroneous authentication submission such that one or more client account warning protection activities may be performed. Furthermore, based upon the authentication resolution model, the various embodiments may improve computer technology by permitting recognition of an authentication attack in response to a certain erroneous authentication submission such that one or more client account attack protection activities may be performed. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to managing client authentication. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105 and a server system 135, each connected to a communications network 185.

Illustratively, client computing system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client computing system 105 are accessed or controlled by one or more clients. Although shown as a single computing system, client computing system 105 is included to be representative of a single client or multiple clients. The one or more clients associated with the client computing system 105 (or multiple respective client computing systems 105) may include at least one entity (a group or an individual) seeking access to and/or having ownership of an account requiring authentication management. In an embodiment, client computing system 105 is a thin client. Memory 107 includes a client application 119. In an embodiment, client application 119 is an online application configured for interfacing with server system 135 and other computing systems. Client application 119 includes a client application interface 121. In the event of multiple clients, multiple instances of client computing system 105 may be present, each having a respective client application 119 including at least one respective client application interface 121. Client application interface 121 includes a graphical user interface (GUI), a command line interface, and/or a sensory interface (e.g., capable of discerning and processing client sound/voice commands and/or client gestures). Client application interface 121 optionally is or includes an authentication interface for facilitating client authentication with respect to a client account accessible via server system 135. Storage 109 includes client application data 123 associated with client application 119. One or more components of a GUI, a command line interface, and/or a sensory interface included in client application interface 121 may facilitate client input and/or may facilitate display of client application data 123. Client application data 123 optionally includes data associated with a client authentication profile. I/O device interface 111 is communicatively coupled to client I/O device(s) 125 (e.g., touchscreen console, trackpad, joystick, microphone, speaker, etc.). The client(s) may interact with client application interface 121 via the client I/O device(s) 125. CPU 113 is included to be representative of a single CPU, multiple CPUs, a single CPU having multiple processing cores, and the like. Client network interface 115 is configured to receive data from and transmit data to server system 135 via network 185.

Although shown as a single computing system, server system 135 is included to be representative of a single server system or multiple server systems. In an embodiment, server system 135 includes a single hardware server configured to provide hosting capabilities. In an alternative embodiment, server system 135 includes, or is otherwise operatively coupled to, a plurality of hardware and/or virtualized servers configured to provide hosting capabilities. In a further alternative embodiment, server system 135 is a cloud server system configured to provide distributed hosting capabilities via a plurality of nodes in a cloud computing environment. According to such further alternative embodiment, the cloud computing nodes are configured to communicate with one another. Additionally, according to such further alternative embodiment, the cloud computing environment optionally offers infrastructure, platforms, and/or software as a service for which client computing system 105 or other systems associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes an authentication application 149. Authentication application 149 includes or is otherwise operatively coupled to an authentication resolution model representation 151. In an embodiment, authentication application 149 is configured to execute one or more artificial intelligence algorithms, e.g., utilizing one or more machine learning techniques, via authentication resolution model representation 151. According to such embodiment, authentication resolution model representation 151 includes or is otherwise operatively coupled to an authentication resolution model and at least one knowledge base associated therewith. According to such embodiment, some or all aspects of the authentication resolution model may run within server system 135. Additionally or alternatively, some or all aspects of the authentication resolution model may run externally to server system 135, e.g., via a cloud-based implementation, in which case server system 135 communicates with or accesses such aspects of the authentication resolution model via authentication resolution model representation 151. Some or all aspects of the at least one knowledge base optionally are incorporated into server system 135. Alternatively, some or all aspects of the at least one knowledge base are externally located and communicatively coupled to server system 135. Memory 137 further includes or is otherwise operatively coupled to database management system (DBMS) 153. DBMS 153 is included to be representative of a single database system or multiple database systems. Authentication application 149 is configured to manage client authentication according to the various embodiments described herein. In an embodiment, authentication application 149 is configured to authenticate, or is configured to facilitate authentication of, one or more clients associated with client computing system 105 and/or other client systems in computing infrastructure 100. In an alternative embodiment, authentication application 149 serves as an intermediary between client computing system 105 and an external authentication server 175 (e.g., a directory-based authentication server). According to such alternative embodiment, authentication application 149 sends authentication information associated with client computing system 105 and/or other client systems, either in original form or modified in a form to facilitate authentication, to external authentication server 175, which may in turn perform any necessary authentication processing. According to such alternative embodiment, external authentication server 175 optionally is cloud-based and is communicatively coupled to elements of computing infrastructure 100 via network 185.

Storage 139 includes authentication application data 155. Authentication application 149 generates and processes authentication application data 155 based on interaction with other components of computing infrastructure 100. Authentication application data 155 includes knowledge base data 157 generated by, used by, or otherwise associated with the authentication resolution model. Knowledge base data 157 includes datapoints pertaining to authentication submissions as well as authentication exception(s), authentication warning(s), and/or authentication attack(s) defined in the authentication resolution model. Knowledge base data 157 further includes data associated with the at least one knowledge base. Storage 139 further includes server databases 159. DBMS 153 includes or interfaces with at least one software application configured to manage server databases 159. In an embodiment, authentication application 149 sends database requests to DBMS 153 and processes results returned by DBMS 153. In a further embodiment, server databases 159 include one or more relational databases. In an additional embodiment, server databases 159 include one or more ontology trees or other ontological structures. While FIG. 1 illustrates three server databases 159 in an example context, server system 135 (and more generally computing infrastructure 100) may include any number of databases. According to a further embodiment, DBMS 153 sends requests to remote databases (not shown) via network 185.

I/O device interface 141 is communicatively coupled to server I/O device(s) 161. CPU 143 is included to be representative of a single CPU, multiple CPUs, a single CPU having multiple processing cores, and the like. Server network interface 145 is configured to receive data from and transmit data to client computing system 105 or other client system(s) via network 185. Specifically, authentication application 149 is configured to accept requests sent by client computing system 105 or other client system(s) to server system 135 and is configured to transmit data to client computing system 105 or other client system(s) via server network interface 145. Furthermore, in accordance with certain embodiments, server network interface 145 is configured to receive data from and/or transmit data to external authentication server 175.

Figure 2:
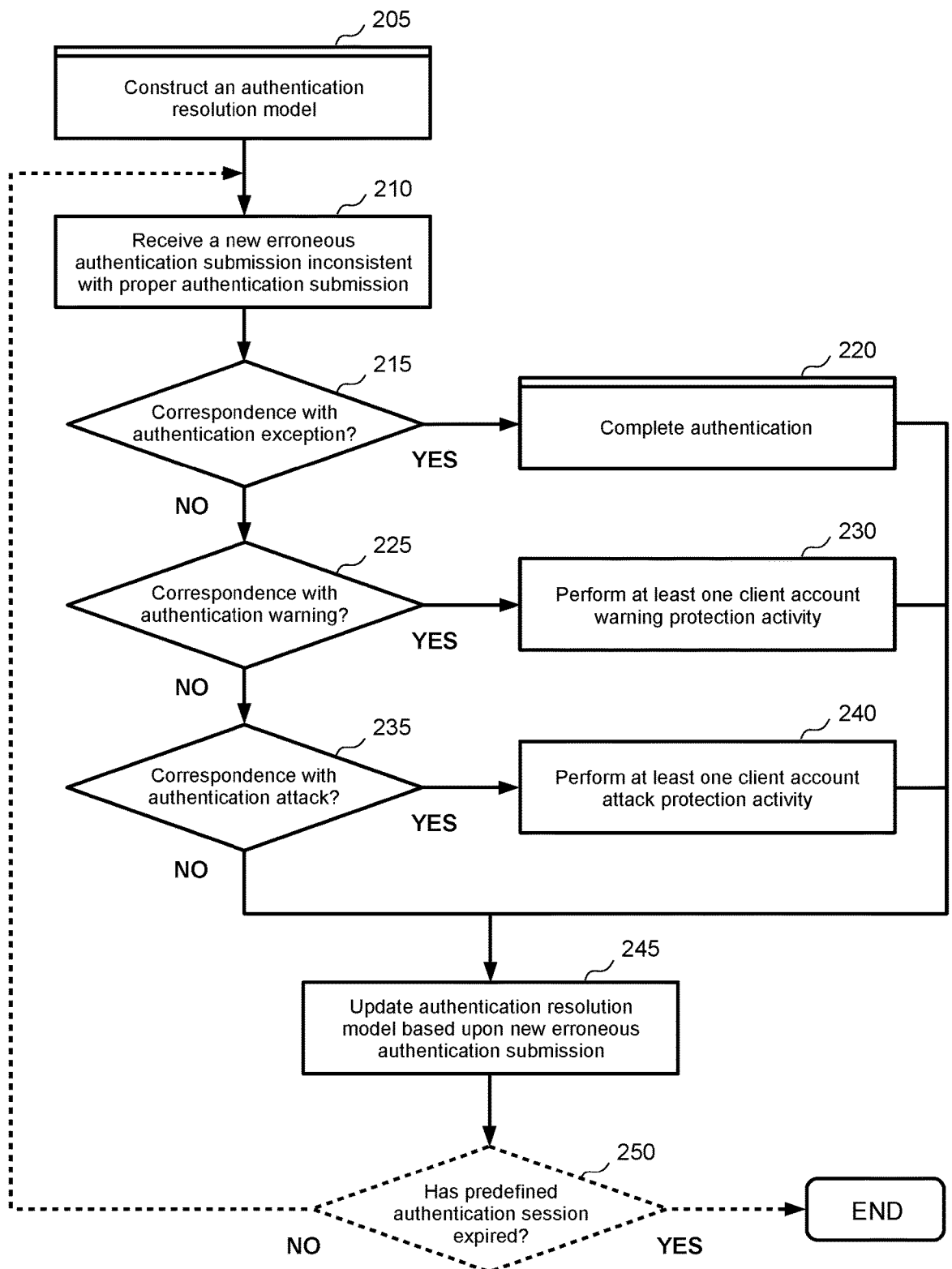
FIG. 2 illustrates a method of managing client authentication, according to one or more embodiments.

FIG. 2 illustrates a method 200 of managing client authentication. The method addresses authentication of an entity attempting to log in to or otherwise access a client account. One or more steps associated with the method 200 and the other methods described herein may be carried out in a client-server computing environment (e.g., computing infrastructure 100) including a network (e.g., network 185). An authentication application in a server system of the client-server computing environment (e.g., authentication application 149 in server system 135 of computing infrastructure 100) facilitates processing according to the method 200 and the other methods described herein. The authentication application interacts with a client (or multiple clients) via a client interface associated with at least one client application of a client computing system (e.g., client application interface 121 associated with client application 119 of client computing system 105). A client in the context of the method 200 and the other methods described herein is an individual or group associated with an account for which authorization is required. Additionally or alternatively to the client-server computing environment, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

In the context of the method 200 and the other methods described herein, the authentication application provides, or is capable of providing, a client (or legal representative(s) of the client) as well as any other authorized entity associated with authentication advance notice of any personal data collection. The authentication application further provides any affected entity an option to opt in or opt out of any such personal data collection at any time. Optionally, the authentication application further transmits at least one notification to any affected entity each time any such personal data collection occurs and/or at designated time intervals.

The method 200 begins at step 205, where the authentication application constructs an authentication resolution model specific to a client based upon error patterns respectively included in a plurality of erroneous authentication submissions that are inconsistent with a proper authentication submission required for an account associated with the client. The account associated with the client, i.e., the client account, is an account owned by the client and/or to which the client has authorized access. In an embodiment, the client account is associated with an operating system account, a web service account, a software application suite account (e.g., an account associated with a word processing/spreadsheet software suite), and/or a DBMS account. The proper authentication submission in the context of the various embodiments described herein is a submission required for proper authentication with respect to the client account, e.g., a designated password, a designated selection of authentication images, and/or a designated selection of authentication text. The authentication resolution model is a type of machine learning knowledge model. In an embodiment, the authentication application constructs the authentication resolution model during at least one course of authentication evaluation. The at least one course of authentication evaluation optionally includes one or more evaluation periods during which the authentication application analyzes each authentication submission with respect to the client account (and optionally other client account(s) for which the same proper authentication submission is required). The authentication application optionally receives one or more of the plurality of erroneous authentication submissions via one or more respective authentication interfaces, e.g., associated with the client interface. The one or more respective authentication interfaces include GUI, command line interface, and/or sensory aspects.

In the context of the various embodiments described herein, an erroneous authentication submission includes an authentication submission (e.g., a user log-in attempt) that is inconsistent with the proper authentication submission. In an embodiment, an erroneous authentication submission is inconsistent with the proper authentication submission such that an error pattern in such erroneous authentication submission does not match or otherwise correspond to a pattern in the proper authentication submission. According to such embodiment, an error pattern included in an erroneous authentication submission constitutes a mistyped password (e.g., a mistyped password string), an erroneous selection of authentication images (e.g., a selection of authentication images in an improper order and/or a selection of an incorrect set of authentication images), an erroneous selection of authentication text (e.g., a selection of authentication characters in an improper order and/or a selection of an incorrect set of authentication characters), and/or any other form of erroneous submission that fails to authenticate the client. In a further embodiment, the authentication application creates a client authentication profile associated with the client and links the authentication resolution model to the newly created client authentication profile. Alternatively, in the event that a client authentication profile associated with the client already exists, the authentication application links the authentication resolution model to the already existing client authentication profile. The authentication resolution model optionally is connected to only a single account associated with the client or alternatively is connected to multiple accounts associated with the client.

In an embodiment, the authentication resolution model records datapoints associated with respective authentication submissions. The model datapoints optionally include metrics for one or more respective authentication submissions, including submission date/time and submission origin (e.g., computing device and/or computing interface from which a submission is received). Additionally or alternatively, the model datapoints include metadata with regard to any error pattern included in an erroneous authentication submission and/or metadata with regard to pattern(s) included in the proper authentication submission. The model datapoints optionally pertain to both respective erroneous authentication submissions (e.g., among the plurality of erroneous authentication submissions) and respective proper authentication submissions. In the context of constructing the authentication resolution model, the authentication application optionally compares model datapoints pertaining to respective erroneous authentication submissions with model datapoints pertaining to respective proper authentication submissions. Additionally or alternatively, the authentication application compares model datapoints among respective erroneous authentication submissions. In a further embodiment, the authentication application stores the model datapoints in at least one client knowledge base associated with the authentication resolution model. According to such further embodiment, the authentication application logs the model datapoints among knowledge base data (e.g., knowledge base data 157) accessible via the server system and/or accessible via another server cloud-based server. The authentication application interfaces with the authentication resolution model via a model representation (e.g., authentication resolution model representation 151). A method of constructing the authentication resolution model specific to the client in accordance with step 205 is described with respect to FIG. 3.

Upon construction of the authentication resolution model at step 205, the authentication application proceeds to dynamically manage client authentication in subsequent steps. Optionally, such dynamic client authentication management occurs during a predefined authentication session. Parameters of any predefined authentication session, such as session length and applicable authentication method(s), optionally are designated by the authentication application or alternatively are designated by the client. A predefined authentication session optionally is a predefined period of time, or alternatively the authentication application or the client may end a predefined authentication session dynamically. Additionally or alternatively, dynamic client authentication management as reflected in the steps of the method 200 may occur within other durations as designated by the authentication application and/or the client.

At step 210, the authentication application receives, via an authentication interface, a new erroneous authentication submission that is inconsistent with the proper authentication submission. The authentication interface is included in or otherwise related to the client interface associated with the at least one client application of the client computing system. The authentication interface includes GUI, command line interface, and/or sensory aspects. The authentication interface optionally is among the one or more respective authentication interfaces via which the authentication application optionally receives one or more of the plurality of erroneous authentication submissions at step 205. The at least one client application optionally includes an operating system application, a web service application, a software application suite (e.g., a word processing/spreadsheet software suite), and/or a DBMS application. In an embodiment, the new erroneous authentication submission is inconsistent with the proper authentication submission such that an error pattern in the new erroneous authentication submission does not match or otherwise correspond to a pattern in the proper authentication submission. An error pattern within the new erroneous authentication submission constitutes a mistyped password (e.g., a mistyped password string), an erroneous selection of authentication images (e.g., a selection of authentication images in an improper order and/or a selection of an incorrect set of authentication images), an erroneous selection of authentication text (e.g., a selection of authentication characters in an improper order and/or a selection of an incorrect set of authentication characters), and/or any other form of erroneous submission that fails to authenticate the client.

At step 215, the authentication application determines whether the new erroneous authentication submission corresponds to an authentication exception defined in the authentication resolution model. Responsive to determining that the new erroneous authentication submission does not correspond to an authentication exception defined in the authentication resolution model, the authentication application proceeds directly to step 225. Conversely, responsive to determining that the new erroneous authentication submission corresponds to an authentication exception defined in the authentication resolution model, at step 220 the authentication application completes authentication with respect to the client account. According to steps 215 and 220, the authentication application completes authentication responsive to receiving any new erroneous authentication submission corresponding to an authentication exception defined in the authentication resolution model. In an embodiment, the authentication application determines that the new erroneous authentication submission corresponds to an authentication exception defined in the authentication resolution model by identifying a match between an error pattern included in the new erroneous authentication submission and an error pattern included in the authentication exception having a level of similarity to a pattern included in the proper authentication submission exceeding a predefined level of confidence threshold and that occurs a number of times exceeding a predefined error occurrence threshold over a duration of time exceeding a predefined learning threshold. In the context of the various embodiments described herein, an occurrence of an error pattern included in an authentication exception refers to inclusion of the error pattern in a given erroneous authentication submission received by the authentication application.

In the context of the method 200 and the other methods described herein, the predefined level of confidence threshold reflects a threshold beyond which the authentication application may confirm that an error pattern included in an erroneous authentication submission has a level of similarity to a pattern included in the proper authentication submission sufficient to conclude that the erroneous authentication submission is made by the client rather than another entity (e.g., another user or group attempting to illicitly gain access to the client account). The predefined error occurrence threshold reflects a number of error occurrences beyond which the authentication application has sufficient data to confirm that the error pattern is made by the client rather than another entity. The learning threshold reflects a duration beyond which the authentication application has sufficient time to analyze characteristics of the error pattern included in an erroneous authentication submission and to confirm based upon such analysis that the error pattern is made by the client rather than another entity. The authentication application creates an authentication exception including an error pattern due to a rationale that an entity other than the client to be authenticated is unlikely to submit an error pattern that meets each of the authentication exception criteria. The authentication application optionally establishes and/or applies one or more of the authentication exception criteria in view of aspects of the authentication resolution model. In an embodiment, the authentication application identifies a match between an erroneous typed password in the new erroneous authentication submission and typed password information recorded in the authentication exception defined in the authentication resolution model. Additionally or alternatively, the authentication application identifies a match between an erroneous selection of authentication images in the new erroneous authentication submission and a selection of authentication images recorded in the authentication exception. Additionally or alternatively, the authentication application identifies a match between an erroneous selection of authentication text in the new erroneous authentication submission and a selection of authentication text recorded in the authentication exception. A method of completing authentication with respect to the client account in accordance with step 220 is described with respect to FIG. 5. Upon completion of step 220, the authentication application proceeds directly to step 245.

At step 225, the authentication application determines whether the new erroneous authentication submission corresponds to an authentication warning defined in the authentication resolution model. Responsive to determining that the new erroneous authentication submission does not correspond to an authentication warning defined in the authentication resolution model, the authentication application proceeds directly to step 235. Responsive to determining that the new erroneous authentication submission corresponds to an authentication warning defined in the authentication resolution model, at step 230 the authentication application performs at least one client account warning protection activity. According to steps 225 and 230, the authentication application performs at least one client account warning protection activity responsive to receiving any new erroneous authentication submission corresponding to an authentication warning defined in the authentication resolution model. The authentication application determines that the new erroneous authentication submission corresponds to an authentication warning defined in the authentication resolution model by identifying a match between an error pattern included in the new erroneous authentication submission and an error pattern included in the authentication warning that occurs a number of times exceeding the predefined error occurrence threshold over a duration of time less than or equal to the predefined learning threshold. In the context of the various embodiments, an occurrence of an error pattern included in an authentication warning refers to inclusion of the error pattern in a given erroneous authentication submission received by the authentication application. In an embodiment, the authentication application identifies a match between an erroneous typed password in the new erroneous authentication submission and typed password information recorded in the authentication warning defined in the authentication resolution model. Additionally or alternatively, the authentication application identifies a match between an erroneous selection of authentication images in the new erroneous authentication submission and a selection of authentication images recorded in the authentication warning. Additionally or alternatively, the authentication application identifies a match between an erroneous selection of authentication text in the new erroneous authentication submission and a selection of authentication text recorded in the authentication warning.

In an embodiment, responsive to determining that the new erroneous authentication submission corresponds to an authentication warning defined in the authentication resolution model, the authentication application notifies the client of the authentication warning via a predetermined client communication channel, i.e., a client communication channel separate from the authentication interface via which the client may receive notifications and/or may transmit requests with regard to client account authentication. The predetermined client communication channel may include a client email application and/or another designated client application. Additionally or alternatively, responsive to determining that the new erroneous authentication submission corresponds to an authentication warning defined in the authentication resolution model, the authentication application provides to the client via the predetermined client communication channel an option to designate the authentication warning as an authentication exception. In an embodiment, in the event that the new erroneous authentication submission is submitted by the client but does not meet the authentication exception criteria and instead corresponds to an authentication warning, the authentication application provides the client an option to request via the predetermined client communication channel that the authentication warning be reclassified as an authentication exception. In the context of such reclassification embodiment, the authentication application optionally requires the client to provide a confirmatory authentication submission via the predefined client communication channel, e.g., a secondary password or a secondary sequence of authentication images, speech recognition, biometric verification via fingerprinting or facial recognition, etc. Responsive to accepting the client request to reclassify the authentication warning as an authentication exception, the authentication application updates the authentication resolution model by redefining the authentication warning as an authentication exception.

In the context of performing the at least one client account warning protection activity, the authentication application optionally sends at least one notification to the client regarding the new erroneous authentication submission. In an embodiment, the notification optionally includes details regarding the new erroneous authentication submission, including any available submission time information, any available submission location information, and/or any submission origin information, e.g., source device, owner(s) of such source device, type of such source device, any IP address associated therewith, etc. In another embodiment, the authentication application sends, or facilitates sending of, the notification to the client via the predetermined client communication channel. In a further embodiment, the at least one client account warning protection activity is client-configurable. According to such further embodiment, one or more of the at least one notification to the client regarding the new erroneous authentication submission are client-configurable. For instance, the authentication application may provide to the client an option to determine the communication channel(s), frequency, and urgency levels associated with the at least one notification.

In the context of performing the at least one client account warning protection activity, the authentication application optionally transmits a secondary authentication request. In an embodiment, the authentication application sends a request for entry of a secondary password, a request for selection of a secondary sequence of authentication images, and/or a request for selection of a secondary sequence of authentication text. In a further embodiment, the authentication application sends a speech verification request, e.g., to confirm the voice of the client via speech recognition. In a further embodiment, the authentication application sends a request for biometric verification, e.g., fingerprinting and/or facial recognition. The authentication application optionally displays the secondary authentication request via the authentication interface, or the authentication application alternatively displays the secondary authentication request via the predetermined client communication channel. Upon completion of step 230, the authentication application proceeds directly to step 245.

At step 235, the authentication application determines whether the new erroneous authentication submission corresponds to an authentication attack defined in the authentication resolution model. Responsive to determining that the new erroneous authentication submission does not correspond to an authentication attack defined in the authentication resolution model, the authentication application proceeds directly to step 245. Conversely, responsive to determining that the new erroneous authentication submission corresponds to an authentication attack defined in the authentication resolution model, at step 240 the authentication application performs at least one client account attack protection activity. According to steps 235 and 240, the authentication application performs at least one client account attack protection activity responsive to receiving any new erroneous authentication submission corresponding to an authentication attack defined in the authentication resolution model. The authentication application determines that the new erroneous authentication submission corresponds to an authentication attack defined in the authentication resolution model by identifying a match between an error pattern included in the new erroneous authentication submission and an error pattern included in the authentication attack among a plurality of error patterns that occur an equal number of times and that collectively occur a number of times exceeding the predefined error occurrence threshold (i.e., the sum of occurrences of the plurality of error patterns in aggregate exceeds the predefined error occurrence threshold). In the context of the various embodiments, an occurrence of an error pattern included in an authentication attack refers to inclusion of the error pattern in a given erroneous authentication submission received by the authentication application. In an embodiment, the authentication application identifies a match between an erroneous typed password in the new erroneous authentication submission and typed password information recorded in the authentication attack defined in the authentication resolution model. Additionally or alternatively, the authentication application identifies a match between an erroneous selection of authentication images in the new erroneous authentication submission and a selection of authentication images recorded in the authentication attack. Additionally or alternatively, the authentication application identifies a match between an erroneous selection of authentication text in the new erroneous authentication submission and a selection of authentication text recorded in the authentication attack.

In the context of performing the at least one client account attack protection activity, the authentication application optionally facilitates client account lockout. In an embodiment, the at least one client account attack protection activity is client-configurable. According to such embodiment, one or more aspects facilitating the client account lockout are client-configurable, e.g., length of lockout, requirements for resolving the lockout, etc. In another embodiment, in a context in which the authentication application controls authentication system access, the authentication application performs the client account lockout. Alternatively, in a context in which the authentication application serves as an intermediary between a user and an authentication server, such as a directory-based authentication server (e.g., external authentication server 175), the authentication application transmits a client account lockout request to such authentication server. In a further embodiment, the at least one client account attack protection activity includes each of, or a subset of, the at least one client account warning protection activity. According to such further embodiment, responsive to determining that the new erroneous authentication submission corresponds to an authentication attack defined in the authentication resolution model, the authentication application optionally notifies the client of the authentication attack via the predetermined client communication channel. The at least one client account attack protection activity optionally includes relatively more active and/or relatively more urgent activities for account protection compared to the at least one client warning protection activity. For instance, in a scenario in which both performing the at least one client account warning protection activity and performing the at least one client account attack protection activity include facilitating client account lockout, a client lockout associated with the at least one client account attack protection activity may include relatively more stringent lockout resolution requirements in terms of required activity and/or timeframe compared to a client lockout associated with the at least one client account warning protection activity.

At step 245, the authentication application updates the authentication resolution model specific to the client based upon the new erroneous authentication submission. In an embodiment, the authentication application updates the authentication resolution model by recording details with respect to the new erroneous authentication submission, including date/time of submission, any error pattern within submission, location of submission, device source of submission, etc. The authentication application optionally updates the authentication resolution model by recording the details of the new erroneous authentication submission, as well as any other erroneous authentication submission, in an authentication submission log associated with the client. Such details optionally include level of similarity between an error pattern included in the new erroneous authentication submission and a pattern included in the proper authentication submission, number of occurrences of the error pattern, and/or date/time of occurrence of the error pattern. Optionally, the authentication application additionally records details with regard to successful client authentication submissions in the authentication submission log. Optionally, the authentication submission log is included in or is otherwise associated with the at least one client knowledge base, in which case log data is included among the knowledge base data.

In an embodiment, the authentication application updates the authentication resolution model at step 245 by processing the error pattern of the new erroneous authentication submission in order to define a new authentication exception responsive to determining that the error pattern included in the new erroneous authentication submission newly meets authentication exception requirements as defined in the authentication resolution model consequent to the new erroneous authentication submission. In a further embodiment, the authentication application updates metadata related to an existing authentication exception defined in the authentication resolution model responsive to determining that the new erroneous authentication submission corresponds to the existing authentication exception, e.g., responsive to determining that the error pattern included in the new erroneous authentication submission matches an error pattern included in the existing authentication exception. In a further embodiment, the authentication application defines a new authentication warning in the authentication resolution model responsive to determining that the error pattern in the new erroneous authentication submission newly meets authentication warning requirements as defined in the authentication resolution model consequent to the new erroneous authentication submission. In a further embodiment, the authentication application updates metadata related to an existing authentication warning defined in the authentication resolution model responsive to determining that the new erroneous authentication submission corresponds to the existing authentication warning, e.g., responsive to determining that the error pattern included in the new erroneous authentication submission matches an error pattern included in the existing authentication warning. In a further embodiment, the authentication application defines a new authentication attack in the authentication resolution model responsive to determining that the error pattern included in the new erroneous authentication submission occurs among a plurality of error patterns consistent with an authentication attack that is not already defined in the authentication resolution model. In a further embodiment, the authentication application updates metadata related to an existing authentication attack defined in the authentication resolution model responsive to determining that the new erroneous authentication submission corresponds to the existing authentication attack, e.g., responsive to determining that the error pattern included in the new erroneous authentication submission matches an error pattern among a plurality of error patterns included in the existing authentication attack. In a further embodiment, in the event that the new erroneous authentication submission does not correspond to an authentication exception, an authentication warning, or an authentication attack, the authentication application optionally stores metadata, including error pattern information, for the new erroneous authentication submission among a set of unclassified error patterns. The authentication application optionally stores the set of unclassified error patterns in the authentication submission log. By updating the authentication resolution model based upon the new erroneous authentication submission and other erroneous authentication submissions, the authentication application is configured to dynamically adapt the authentication resolution model over time, e.g., beyond the at least one course of authentication evaluation during which the authentication application constructs the model per step 205.

Optionally, at step 250 the authentication application determines whether any established predefined authentication session has expired. Responsive to determining that any such predefined authentication session has expired, the method 200 ends. Responsive to determining that any such predefined authentication session has not expired, the authentication application optionally returns to step 210 in order to continue dynamically managing client authentication, e.g., by addressing any additional received erroneous authentication submission(s).

Figure 3:
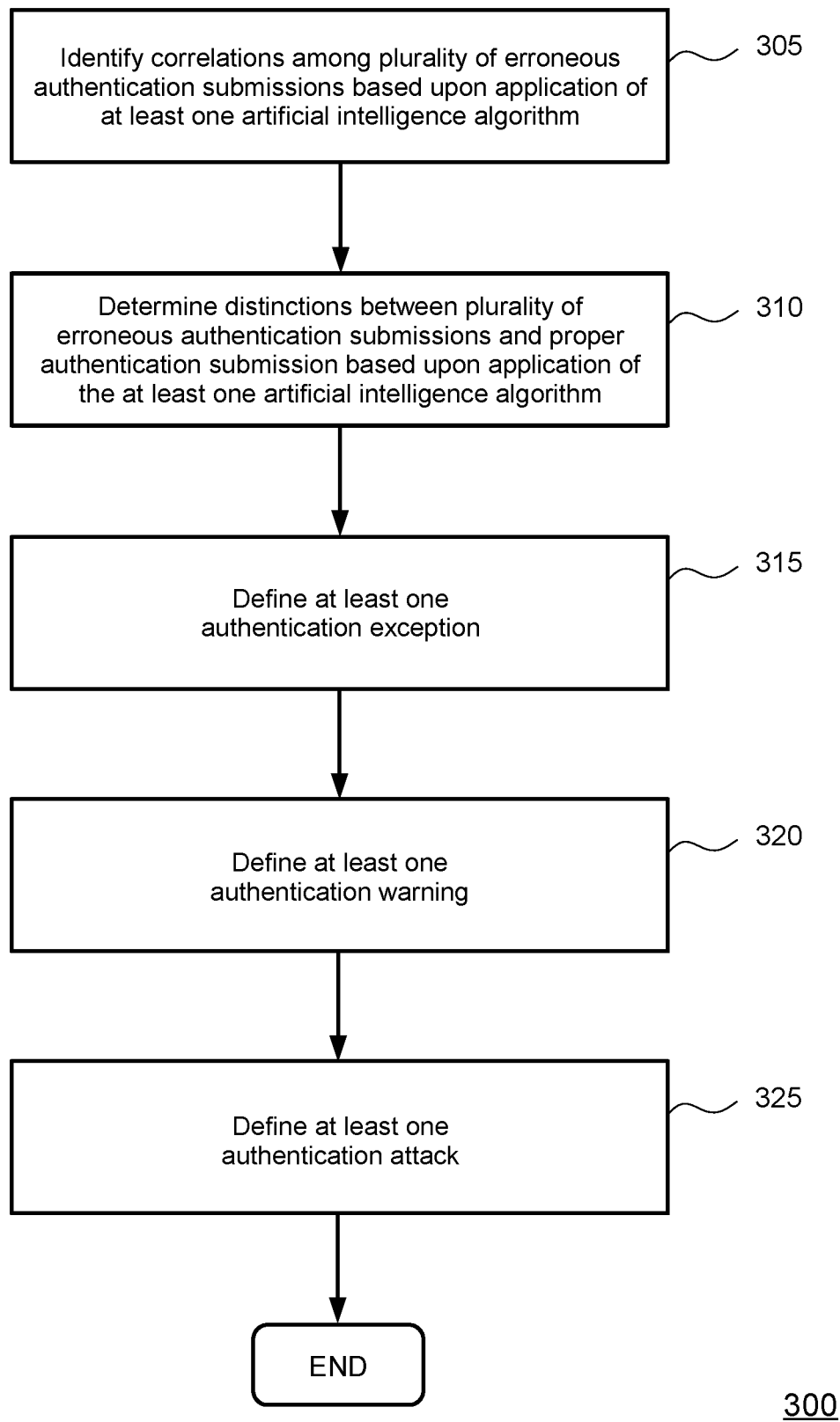
FIG. 3 illustrates a method of constructing an authentication resolution model specific to a client, according to one or more embodiments.

FIG. 3 illustrates a method 300 of constructing the authentication resolution model specific to the client. The method 300 provides one or more example embodiments with respect to step 205 of the method 200. The method 300 begins at step 305, where the authentication application identifies correlations among the plurality of erroneous authentication submissions based upon application of at least one artificial intelligence algorithm. In an embodiment, the at least one artificial intelligence algorithm includes at least one machine learning algorithm. In an embodiment, the authentication application applies a clustering algorithm based upon the model datapoints (e.g., recorded error patterns) to identify correlations, both in terms of similarities and distinctions, among the plurality of erroneous authentication submissions. As further described herein, the authentication application in turn defines aspects of the model based upon a plurality of rules (specifically, a plurality of threshold criteria) in view of the identified correlations. Furthermore, the authentication application optionally populates the at least one client knowledge base with the defined aspects. By identifying correlations at step 305, the authentication application determines a number of occurrences of respective error patterns within received erroneous authentication submissions.

At step 310, the authentication application determines distinctions between the plurality of erroneous authentication submissions and the proper authentication submission based upon application of the at least one artificial intelligence algorithm. The artificial intelligence algorithm(s) applied at step 310 optionally are the same as applied at step 305 or alternatively differ. In an embodiment, the authentication application applies at least one machine learning algorithm by comparing one or more of the plurality of erroneous authentication submissions with the proper authentication submission to determine distinctions. According to such embodiment, the authentication application compares respective error patterns included in one or more of the plurality of erroneous authentication submissions with pattern(s) included in the proper authentication submission and trains the authentication resolution model based upon the pattern comparison. By determining distinctions at step 310, the authentication application determines level of similarity between respective error patterns within received erroneous authentication submissions and pattern(s) in the proper authentication submission.

At step 315, the authentication application defines at least one authentication exception. Each of the at least one authentication exception includes an error pattern that has a level of similarity to a pattern included in the proper authentication submission exceeding a predefined level of confidence threshold and that occurs a number of times exceeding a predefined error occurrence threshold over a duration of time exceeding a predefined learning threshold. In an embodiment, the authentication application determines the level of similarity at least in part based upon a quantity of distinctions and/or relative significance of distinctions between respective error patterns respectively included in one or more of the plurality of erroneous authentication submissions and pattern(s) included in the proper authentication submission. According to such embodiment, the authentication application provides a system administrator associated with the authentication application an option to designate the predefined level of confidence threshold. Additionally or alternatively, the authentication application provides the client an option to designate the predefined level of confidence threshold, e.g., in accordance with client preferences and/or client security requirements. In another embodiment, the authentication application provides a system administrator of the authentication application an option to designate the predefined error occurrence threshold, e.g., in accordance with server system security policies and/or in accordance with available system resources. Additionally or alternatively, the authentication application provides the client an option to designate the predefined error occurrence threshold, e.g., in accordance with client preferences and/or client security requirements. Alternatively, the authentication application determines the predefined error occurrence threshold based upon application of the at least one artificial intelligence algorithm to the model datapoints (e.g., a clustering algorithm configured to group respective error occurrences). In a further embodiment, the authentication application provides a system administrator of the authentication application an option to designate the predefined learning threshold, e.g., in accordance with server system security policies and/or in accordance with server system capabilities such that the server system has sufficient data to conduct any relevant machine learning required to process respective error patterns. Additionally or alternatively, the authentication application provides the client an option to designate the predefined learning threshold, e.g., in accordance with client preferences and/or client security requirements. Alternatively, the authentication application determines the predefined learning threshold based upon application of the at least one artificial intelligence algorithm to the model datapoints (e.g., a machine learning algorithm configured to determine level of required model training).

In an embodiment, the authentication application stores the at least authentication exception defined at step 315 in the at least one client knowledge base. In a further embodiment, the authentication application encrypts each of the at least one authentication exception. According to such further embodiment, in the event that a single authentication exception is defined in the authentication resolution model, the authentication application encrypts the single authentication exception. In the event that multiple authentication exceptions are defined in the authentication resolution model, the authentication application encrypts the multiple authentication exceptions. Moreover, according to such further embodiment, the authentication application optionally encrypts each of the at least one authentication exception by applying a hash function. A method of identifying a correspondence between the new erroneous authentication submission and an authentication exception defined in an authentication resolution model in a context in which each authentication exception defined in the authentication resolution model is encrypted is described with respect to FIG. 4.

At step 320, the authentication application defines at least one authentication warning. Each of the at least one authentication warning includes an error pattern that occurs a number of times exceeding the predefined error occurrence threshold over a duration of time less than or equal to the predefined learning threshold. An authentication warning reflects a unique error pattern submitted in excess of the threshold number of error occurrences over a duration of time that does not exceed (i.e., is less than or equal to) the predefined learning threshold. While it is possible that an error pattern associated with an authentication warning is submitted by the client, such error pattern is not submitted over a duration of time that exceeds the predefined learning threshold such that the authentication application may define such error pattern as associated with an authentication exception (though, as discussed in accordance with an aforementioned embodiment, the client optionally may request reclassification of an authentication warning to an authentication exception). In an embodiment, the authentication application stores the at least one authentication warning in the at least one client knowledge base.

At step 325, the authentication application defines at least one authentication attack. Each of the at least one authentication attack includes a plurality of error patterns that occur an equal number of times and that collectively occur a number of times exceeding the predefined error occurrence threshold. A plurality of error patterns occurring an equal number of times and that occur in aggregate a number of times exceeding the predefined error occurrence threshold may be indicative of a brute force attack, e.g., a dictionary attack. In an embodiment, the authentication application stores the at least one authentication attack in the at least one client knowledge base.

In an embodiment, the authentication application executes only a subset of the steps of the method 200 and/or the method 300. For instance, the authentication application optionally constructs an authentication resolution model by defining at least one authentication exception, without defining at least one authentication warning and/or without defining at least one authentication attack. In such instance, the authentication application optionally executes steps pertaining to authentication exception(s) defined by the model while omitting steps pertaining to authentication warning(s) and/or authentication attack(s).

Figure 4:
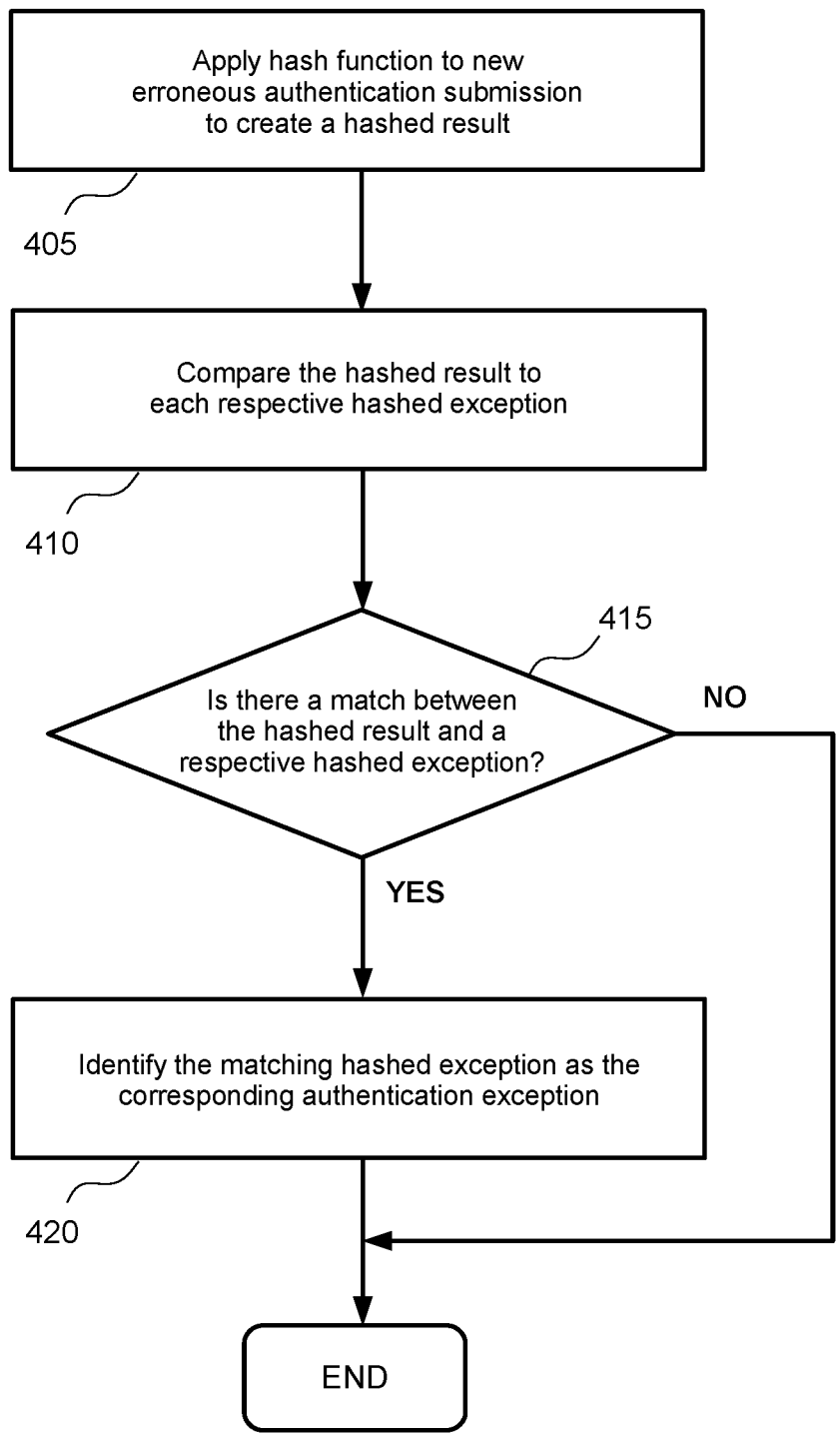
FIG. 4 illustrates a method of identifying a correspondence between a new erroneous authentication submission and an authentication exception defined in an authentication resolution model in a context in which each defined authentication exception is encrypted, according to one or more embodiments.

FIG. 4 illustrates a method 400 of identifying a correspondence between the new erroneous authentication submission and an authentication exception defined in the authentication resolution model in a context in which each authentication exception defined in the authentication resolution model is encrypted to create a respective hashed exception by applying a hash function. Accordingly, the method 400 includes steps relevant to determining that the new erroneous authentication submission corresponds to an authentication exception defined in the authentication resolution model per step 215 in an encryption context. The method 400 begins at step 405, where the authentication application applies the hash function to the new erroneous authentication submission to create a hashed result. At step 410, the authentication application compares the hashed result corresponding to the new erroneous authentication submission to each respective hashed exception corresponding to each authentication exception defined in the authentication resolution model. In an embodiment, the authentication application iteratively compares the hashed result to each respective hashed exception. At step 415, the authentication application determines whether there is a match between the hashed result corresponding to the new erroneous authentication submission and a respective hashed exception corresponding to an authentication exception defined in the authentication resolution model. Responsive to identifying no match between the hashed result and a respective hashed exception, the authentication application proceeds to the end of the method 400. Responsive to identifying a match between the hashed result and a respective hashed exception, at step 420 the authentication application identifies the matching hashed exception (i.e., the respective hashed exception matching the hashed result) as the corresponding authentication exception. Subsequently, the authentication application optionally executes steps for completing authentication based upon the corresponding authentication exception. For instance, when applicable, the authentication application optionally facilitates entry of a proper authentication submission required for proper authentication, e.g., an expected password or an expected sequence of authentication images.

Figure 5:
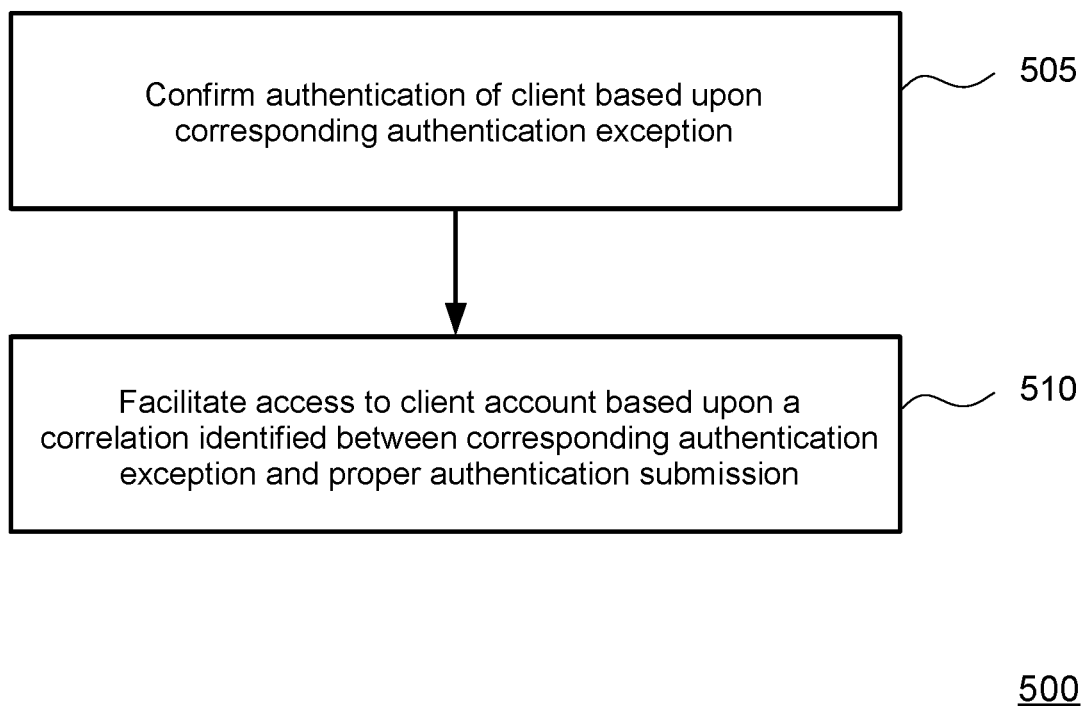
FIG. 5 illustrates a method of completing authentication based upon an authentication exception defined in an authentication resolution model, according to one or more embodiments.

FIG. 5 illustrates a method 500 of completing authentication with respect to the client account based upon the corresponding authentication exception defined in the authentication resolution model. The method 500 provides one or more example embodiments with respect to step 220 of the method 200. The method 500 begins at step 505, where the authentication application confirms authentication of the client based upon the corresponding authentication exception. At step 510, the authentication application facilitates access to the client account based upon a correlation identified between the corresponding authentication exception and the proper authentication submission. In an embodiment, metadata within the corresponding authentication exception may identify the correlation between an error pattern included in the new erroneous authentication submission and a pattern included in the proper authentication submission such that any difference between the respective patterns is determined and reconciled.

As for facilitating access to the client account per step 510, in a context in which the authentication application controls authentication system access, the authentication application optionally grants client access immediately, i.e., dynamically in real time. In such context, identifying the correlation would be sufficient for the authentication application to grant access, and thus no proper authentication submission need be entered via the authentication interface. Alternatively, in a context in which the authentication application serves as an intermediary between a user and an authentication server, the authentication application optionally facilitates entry of the proper authentication submission into the authentication interface and/or any other interface associated with the authentication server. In such context, the authentication application optionally serves as middleware between the server system and the authentication server. In an embodiment, the authentication application facilitates entry of the proper authentication submission by entering the proper authentication submission directly via the authentication interface. In a further embodiment, the authentication application facilitates entry of the proper authentication submission by modifying the new erroneous authentication submission received via the authentication interface to coincide with the proper authentication submission. According to such further embodiment, in the event that the new erroneous authentication submission includes a mistyped password, and text of the mistyped password matches text included in an authentication exception defined in the authentication resolution model, the authentication application modifies the mistyped password to coincide with a proper password and subsequently facilitates client account access based upon the proper password. In the event that the new erroneous authentication submission includes an erroneous selection of authentication images, and the erroneous selection of authentication images matches an erroneous selection included in an authentication exception defined in the authentication resolution model, the authentication application modifies the erroneous selection of authentication images to coincide with a proper selection of authentication images and subsequently facilitates client account access based upon the proper selection.

In the context of an example scenario in accordance with the various embodiments, per step 205 the authentication application constructs an authentication resolution model specific to a Client A based upon a plurality of erroneous authentication submissions inconsistent with a proper authentication submission. For purposes of this example scenario, the proper authentication submission is assumed to include the password text string "ClientASuperUser@ @ @ @". The authentication application prompts for a password text string consistent with the proper authentication submission in order to access a Client A account. Per step 210, the authentication submission receives a new erroneous authentication submission from a user attempting to access the Client A account. Assuming that the new erroneous authentication submission includes the error pattern (i.e., erroneous password text string) "ClientASuperUser@ @ @$", per step 215 the authentication application determines whether the new erroneous authentication submission corresponds to an authentication exception defined in the authentication resolution model specific to Client A. For purposes of this example scenario, it is assumed that there is a match between the erroneous password text string "ClientASuperUser@ @ @$" included in the new erroneous authentication submission and an error pattern "ClientASuperUser@ @ @$" included in an authentication exception defined in the authentication resolution model, and thus the authentication application determines a correspondence between the new erroneous authentication submission and the authentication exception according to step 215. The authentication exception is defined as such in the authentication resolution model because the error pattern included in the authentication exception meets the relevant authentication exception criteria. Specifically, the error pattern included in the authentication exception has a level of similarity to the proper authentication submission of 95%, which exceeds a predefined level of confidence threshold, which in this case is assumed to be designated by a system administrator as 90% (the level of similarity between the error pattern "ClientASuperUser@ @ @$" included in the authentication exception and the pattern "ClientASuperUser@ @ @ @" included in the proper authentication submission is 19 characters out of 20, or 95%). Additionally, the error pattern included in the authentication exception is assumed to occur a number of times exceeding a predefined error occurrence threshold over a duration of time exceeding a predefined learning threshold. For instance, it is assumed that the erroneous password text string included in the authentication exception occurs 15 times (i.e., is included in 15 erroneous authentication submissions), greater than a predefined error occurrence threshold assumed for purposes of this example scenario and other example scenarios further described herein to be designated by the system administrator at 10, and it is further assumed that the 15 occurrences of the error pattern included in the authentication exception occurs over a period of 72 hours, greater than a predefined learning threshold assumed for purposes of this example scenario and other example scenarios further described herein to be designated by the system administrator at 48 hours.

Responsive to determining that the new erroneous authentication submission corresponds to the authentication exception per step 215, per step 220 the authentication application completes authentication with respect to the Client A account. Per step 505, the authentication application confirms authentication of Client A based upon the corresponding authentication exception defined in the authentication resolution model. Therefore, the authentication application ascertains that the user attempting to access the Client A account via the new erroneous authentication submission is Client A. Per step 510, the authentication application facilitates Client A account access based upon a correlation identified between the corresponding authentication exception and the proper authentication submission. Assuming that the authentication application serves as an intermediary between the computing system through which Client A requests authentication and an external authentication server, in this scenario the authentication application may modify the new erroneous authentication submission to coincide with the proper authentication submission, i.e., the authentication application may modify the erroneous password text string "ClientASuperUser@ @ @$" included in the new erroneous authentication submission to coincide with the password text string "ClientASuperUser@ @ @ @" included in the proper authentication submission. Subsequent to completing authentication per step 220 and more specifically per the steps of the method 500, the authentication application proceeds to step 245, where the authentication application updates the authentication resolution model based upon the new erroneous authentication submission. More specifically, the authentication application updates metadata related to the corresponding authentication exception based upon characteristics of the new erroneous authentication submission. Thus, per this scenario, the authentication application authenticates Client A despite the new erroneous authentication submission and facilitates access to the Client A account based upon the corresponding authentication exception defined in the authentication resolution model.

In the context of a further example scenario in accordance with the various embodiments, per step 205 the authentication application constructs an authentication resolution model specific to a Client B based upon a plurality of erroneous authentication submissions inconsistent with a proper authentication submission. For purposes of this further example scenario, the proper authentication submission is assumed to include the password text string "$$ClientBCoolUser$$". The authentication application prompts for a password text string consistent with the proper authentication submission in order to access a Client B account. Per step 210, the authentication submission receives a new erroneous authentication submission from a user attempting to access the Client B account. Assuming that the new erroneous authentication submission includes the error pattern (i.e., erroneous password text string) "ClientBUser$", per step 215 the authentication application determines whether the new erroneous authentication submission corresponds to an authentication exception defined in the authentication resolution model specific to Client B. For purposes of this further example scenario, it is assumed that there is no match between the erroneous password text string "ClientBUser$" and an error pattern included in an authentication exception defined in the authentication resolution model. Thus, the new erroneous authentication submission does not correspond to an authentication exception.

Accordingly, the authentication application proceeds directly to step 225, where the authentication application determines whether the new erroneous authentication submission corresponds to an authentication warning defined in the authentication resolution model. For purposes of this further example scenario, it is assumed that there is a match between the erroneous password text string "ClientBUser$" included in the new erroneous authentication submission and an error pattern "ClientBUser$" included in an authentication warning defined in the authentication resolution model, and thus the authentication application determines a correspondence between the new erroneous authentication submission and the authentication warning according to step 225. The authentication warning is defined as such in the authentication resolution model because the error pattern included in the authentication warning meets the relevant authentication warning criteria. Specifically, the error pattern included in the authentication warning is assumed to occur a number of times exceeding a predefined error occurrence threshold over a duration of time less than or equal to a predefined learning threshold. For instance, for this scenario it is assumed that the error pattern included in the authentication warning occurs 12 times (i.e., is included in 12 erroneous authentication submissions), greater than the predefined error occurrence threshold assumed to be designated at 10, and it is further assumed that the 12 occurrences of error pattern included the authentication exception occurs over a period of 6 hours, less than the predefined learning threshold assumed to be designated at 48 hours. Responsive to determining per step 225 that the new erroneous authentication submission corresponds to an authentication warning defined in the authentication resolution model, per step 230 the authentication application performs at least one client account warning protection activity. Specifically, performing the at least one client account warning protection activity is assumed to include sending at least one notification to Client B regarding the new erroneous authentication submission via a predetermined client communication channel, e.g., an email application designated by Client B. Subsequent to performing the at least one client account warning protection activity per step 230, the authentication application proceeds to step 245, where the authentication application updates the authentication resolution model based upon the new erroneous authentication submission. More specifically, the authentication application updates metadata related to the corresponding authentication warning based upon characteristics of the new erroneous authentication submission.

In the context of an additional example scenario in accordance with the various embodiments, per step 205 the authentication application constructs an authentication resolution model specific to a Client C based upon a plurality of erroneous authentication submissions inconsistent with a proper authentication submission. For purposes of this additional example scenario, the proper authentication submission is assumed to include the password text string "ClientCUser246". The authentication application prompts for a password text string consistent with the proper authentication submission in order to access a Client C account. Per step 210, the authentication submission receives a new erroneous authentication submission from a user attempting to access the Client C account. Assuming that the new erroneous authentication submission includes the error pattern (i.e., erroneous password text string) "ClientCUser123", per step 215 the authentication application determines whether the new erroneous authentication submission corresponds to an authentication exception defined in the authentication resolution model specific to Client C. For purposes of this additional example scenario, it is assumed that there is no match between the erroneous password text string "ClientCUser123" and an error pattern included in an authentication exception defined in the authentication resolution model. Thus, the new erroneous authentication submission does not correspond to an authentication exception. Accordingly, the authentication application proceeds directly to step 225, where the authentication application determines whether the new erroneous authentication submission corresponds to an authentication warning defined in the authentication resolution model. For purposes of this additional example scenario, it is further assumed that there is no match between the erroneous password text string "ClientCUser123" and an error pattern included in an authentication warning defined in the authentication resolution model. Hence, the new erroneous authentication submission does not correspond to an authentication warning.

Accordingly, the authentication application proceeds directly to step 235, where the authentication application determines whether the new erroneous authentication submission corresponds to an authentication attack defined in the authentication resolution model. For purposes of this further example scenario, it is assumed that there is a match between the erroneous password text string "ClientCUser123" included in the new erroneous authentication submission and an error pattern "ClientCUser123" included in an authentication attack defined in the authentication resolution model, and thus the authentication application determines a correspondence between the new erroneous authentication submission and the authentication attack according to step 235. The authentication attack is defined as such in the authentication resolution model because the error pattern included in the authentication attack meets the relevant authentication attack criteria. Specifically, the error pattern included in the authentication attack is among a plurality of error patterns that occur an equal number of times and that collectively occur a number of times exceeding the predefined error occurrence threshold. For instance, for this scenario it is assumed that error pattern included in the authentication attack is among a plurality of error patterns that occur an equal number of times and that collectively occur 17 times (i.e., are included in 17 erroneous authentication submissions in aggregate), greater than the predefined error occurrence threshold assumed to be designated at 10. Responsive to determining per step 235 that the new erroneous authentication submission corresponds to an authentication attack defined in the authentication resolution model, per step 240 the authentication application performs at least one client account attack protection activity. Specifically, performing the at least one client account attack protection activity may include locking the Client C account. Subsequent to performing the at least one client account attack protection activity per step 240, the authentication application proceeds to step 245, where the authentication application updates the authentication resolution model based upon the new erroneous authentication submission. More specifically, the authentication application updates metadata related to the corresponding authentication attack based upon characteristics of the new erroneous authentication submission.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
constructing an authentication resolution model specific to a client by applying a clustering algorithm based upon error patterns respectively included in a plurality of erroneous authentication submissions inconsistent with a proper authentication submission required for an account associated with the client;
receiving, via an authentication interface, a new erroneous authentication submission inconsistent with the proper authentication submission; and
responsive to determining that the new erroneous authentication submission corresponds to an authentication exception defined in the authentication resolution model, completing authentication.

2. The computer-implemented method of claim 1, further comprising:
responsive to determining that the new erroneous authentication submission corresponds to an authentication warning defined in the authentication resolution model, performing at least one client account warning protection activity.

3. The computer-implemented method of claim 2, wherein performing the at least one client account warning protection activity comprises sending at least one notification to the client regarding the new erroneous authentication submission.

4. The computer-implemented method of claim 2, wherein performing the at least one client account warning protection activity comprises transmitting a secondary authentication request.

5. The computer-implemented method of claim 2, wherein determining that the new erroneous authentication submission corresponds to an authentication warning comprises identifying a match between an error pattern included in the new erroneous authentication submission and an error pattern included in the authentication warning that occurs a number of times exceeding a predefined error occurrence threshold over a duration of time less than or equal to a predefined learning threshold.

6. The computer-implemented method of claim 1, further comprising:
responsive to determining that the new erroneous authentication submission corresponds to an authentication attack defined in the authentication resolution model, performing at least one client account attack protection activity.

7. The computer-implemented method of claim 6, wherein performing the at least one client account attack protection activity comprises facilitating client account lockout.

8. The computer-implemented method of claim 6, wherein determining that the new erroneous authentication submission corresponds to an authentication attack comprises identifying a match between an error pattern included in the new erroneous authentication submission and an error pattern included in the authentication attack among a plurality of error patterns that occur an equal number of times and that collectively occur a number of times exceeding a predefined error occurrence threshold.

9. The computer-implemented method of claim 1, wherein constructing the authentication resolution model comprises:
identifying correlations among the plurality of erroneous authentication submissions based upon application of the clustering algorithm;
determining distinctions between the plurality of erroneous authentication submissions and the proper authentication submission; and
defining at least one authentication exception, wherein each of the at least one authentication exception includes an error pattern that has a level of similarity to a pattern included in the proper authentication submission exceeding a predefined level of confidence threshold and that occurs a number of times exceeding a predefined error occurrence threshold over a duration of time exceeding a predefined learning threshold.

10. The computer-implemented method of claim 9, wherein constructing the authentication resolution model further comprises:
defining at least one authentication warning, wherein each of the at least one authentication warning includes an error pattern that occurs a number of times exceeding the predefined error occurrence threshold over a duration of time less than or equal to the predefined learning threshold.

11. The computer-implemented method of claim 9, wherein constructing the authentication resolution model further comprises:
defining at least one authentication attack, wherein each of the at least one authentication attack includes a plurality of error patterns that occur an equal number of times and that collectively occur a number of times exceeding the predefined error occurrence threshold.

12. The computer-implemented method of claim 1, wherein each authentication exception defined in the authentication resolution model is encrypted to create a respective hashed exception by applying a hash function, and wherein identifying a correspondence between the new erroneous authentication submission and an authentication exception defined in the authentication resolution model comprises:
applying the hash function to the new erroneous authentication submission to create a hashed result;
comparing the hashed result to each respective hashed exception; and
responsive to identifying a match between the hashed result and a respective hashed exception, identifying the matching hashed exception as the corresponding authentication exception.

13. The computer-implemented method of claim 1, wherein completing authentication comprises:
confirming authentication of the client based upon the corresponding authentication exception defined in the authentication resolution model; and
facilitating access to the account associated with the client based upon a correlation identified between the corresponding authentication exception and the proper authentication submission.

14. The computer-implemented method of claim 1, wherein determining that the new erroneous authentication submission corresponds to an authentication exception comprises identifying a match between an error pattern included in the new erroneous authentication submission and an error pattern included in the authentication exception that has a level of similarity to a pattern included in the proper authentication submission exceeding a predefined level of confidence threshold and that occurs a number of times exceeding a predefined error occurrence threshold over a duration of time exceeding a predefined learning threshold.

15. A computer program product comprising a computer readable storage medium having program instructions embodied therewith, the program instructions executable by a computing device to cause the computing device to:
- construct an authentication resolution model specific to a client by applying a clustering algorithm based upon error patterns respectively included in a plurality of erroneous authentication submissions inconsistent with a proper authentication submission required for an account associated with the client;
- receive, via an authentication interface, a new erroneous authentication submission inconsistent with the proper authentication submission; and
- responsive to determining that the new erroneous authentication submission corresponds to an authentication exception defined in the authentication resolution model, complete authentication.

16. The computer program product of claim 15, wherein the program instructions further cause the computing device to:
- responsive to determining that the new erroneous authentication submission corresponds to an authentication warning defined in the authentication resolution model, perform at least one client account warning protection activity.

17. The computer program product of claim 15, wherein the program instructions further cause the computing device to:
- responsive to determining that the new erroneous authentication submission corresponds to an authentication attack defined in the authentication resolution model, perform at least one client account attack protection activity.

18. A system comprising:
- a processor; and
- a memory storing an application program, which, when executed on the processor, performs an operation comprising:
  - constructing an authentication resolution model specific to a client by applying a clustering algorithm based upon error patterns respectively included in a plurality of erroneous authentication submissions inconsistent with a proper authentication submission required for an account associated with the client;
  - receiving, via an authentication interface, a new erroneous authentication submission inconsistent with the proper authentication submission; and
  - responsive to determining that the new erroneous authentication submission corresponds to an authentication exception defined in the authentication resolution model, completing authentication.

19. The system of claim 18, wherein the operation further comprises:
- responsive to determining that the new erroneous authentication submission corresponds to an authentication warning defined in the authentication resolution model, performing at least one client account warning protection activity.

20. The system of claim 18, wherein the operation further comprises:
- responsive to determining that the new erroneous authentication submission corresponds to an authentication attack defined in the authentication resolution model, performing at least one client account attack protection activity.

* * * * *